United States Patent [19]

Struthers

[11] Patent Number: 4,659,634
[45] Date of Patent: Apr. 21, 1987

[54] METHANOL HYDROGEN FUEL CELL SYSTEM

[76] Inventor: Ralph C. Struthers, 39503 Calle El Fuente, Saugus, Calif. 91350

[21] Appl. No.: 825,446

[22] Filed: Feb. 3, 1986

Related U.S. Application Data

[63] Continuation-in-part of Ser. No. 682,983, Dec. 18, 1984, abandoned.

[51] Int. Cl.$^4$ ............................................. H01M 8/06
[52] U.S. Cl. ........................................ 429/19; 429/17
[58] Field of Search ................... 429/19, 17, 20, 27, 429/13, 34

[56] References Cited

U.S. PATENT DOCUMENTS

| | | | |
|---|---|---|---|
| 3,615,850 | 10/1971 | Chludzinski et al. | 429/17 |
| 4,081,693 | 3/1978 | Stone | 429/19 X |
| 4,317,863 | 3/1982 | Struthers | 429/19 |
| 4,473,622 | 9/1984 | Chludzinski et al. | 429/19 |
| 4,495,256 | 1/1985 | Moden | 429/17 |

Primary Examiner—Anthony Skapars
Attorney, Agent, or Firm—Georges A. Maxwell

[57] ABSTRACT

An electro-chemical electric power generating apparatus characterized by first and second electro-chemical fuel cells. Each cell includes a case containing spaced anode and cathode plates, an electrolyte between the plates and an external electric circuit connected therebetween. The apparatus next includes a steam-methane reformer to reform steam and methane to hydrogen enriched gas fuel. The cathode and anode fuels of the first cell are methanol and hydrogen and the byproducts of chemical reaction thereof are water and methane gas. The cathode and anode fuels of the second cell are oxygen and hydrogen and the byproduct of chemical reaction thereof is water. The methane gas byproduct of the first cell and the water byproduct of both cells are conducted to the steam-methane reformer and are reformed thereby into hydrogen enriched fuel gas which is conducted to and feeds the anodes of both of the cells.

8 Claims, 12 Drawing Figures

Fig. 1.

Fig. 2. FUEL CELL-X-

ANODE: $H_2 \rightarrow 2H^+ + 2\bar{e}$  OX = 0.000 V
CATHODE: $CH_3OH + 2H^+ + 2\bar{e} \rightarrow CH_4 + H_2O$  RED = 0.588 V
CELL NET: $H_2 + CH_3OH \rightarrow CH_4 + H_2O$  CELL = 0.588 V

Fig. 3. FUEL CELL-Z-

ANODE: $H_2 \rightarrow 2H^+ + 2\bar{e}$  OX = 0.000 V
CATHODE: $\frac{1}{2}O_2 + 2H^+ + 2\bar{e} \rightarrow H_2O$  RED = 1.229 V
CELL NET: $H_2 + \frac{1}{2}O_2 \rightarrow H_2O$  CELL = 1.229 V

Fig. 4. STEAM-METHANE REFORMER REACTION

1. $CH_4 + 2H_2O \rightarrow CO_2 + 4H_2$
2. $CH_4 + H_2O \rightarrow CO + 3H_2$
3. $CO + H_2O \rightarrow CO_2 + H_2$
4. $CO_2 + CH_4 \rightarrow 2CO + 2H_2$
5. $CH_4 \rightarrow C + 2H_2$
6. $2CO \rightarrow C + CO_2$
7. $C + H_2O \rightarrow CO + H_2$
8. $C + 2H_2O \rightarrow CO_2 + 2H_2$

Fig. 6. FUEL CELL-X- THEORETICAL MODEL $H_2 + CH_3OH \rightarrow CH_4 + H_2O$  CELL = 0.588 V
0.412 Lbs. + 1 GAL. = 3.295 Lbs. + 3.707 Lbs.

FREE Gibbs $\Delta G = (2)(96,500)(.588)\dfrac{(4.184)}{}= 27,123$ KCAL.

W-H/0.412 Lbs. —$H_2$ = $(27,123)(.001622)\dfrac{(.0412 \times 454)}{2}$ (VALANCE) = 2,948.1

(CALORIES)(CONVERSION NO<sup>5</sup>)

Fig. 7. FUEL CELL-Z-THEORETICAL MODEL $$H_2 + \tfrac{1}{2}O_2 \longrightarrow H_2O \qquad CELL = 1.229\,V$$

$$1.236\,Lbs. + 9.884\,Lbs. = 11.124\,Lbs.$$

$$\Delta G = (2)(96,500)(1.229)\left(\frac{1}{4.184}\right) = -56.691\,KCAL.$$

$$W-H/1.236\,Lbs.-H_2 = (56,691)(.001622)\left(\frac{1.236 \times 4.54}{2}\right) = 18,485.8$$

Fig. 8. STEAM-METHANE REFORMER THEORETICAL MODEL $$CH_4 + 2H_2O \xrightarrow[CAT.]{HEAT} CO_2 + 4H_2 \quad \text{(PRIMARY REACTION)}$$

$$3.295\,Lbs. + 7.414\,Lbs. = 9.061\,Lbs. + 1.648\,Lbs.$$

$$\Delta G_r^\circ = [(-94.26)+(0.0)] - [(-12.15) + 2(-56.687)] = +31.264\,KCAL.$$

Fig. 5. GAS COMPOSITION DIAGRAME

VERTICAL—MOL% GASES
HORIZONTAL—MOL% H₂O FEED

CARBON FORMATION

Fig. 9.

FUEL CELL SYSTEM

CELL X: ANODE: $H_2 \rightarrow 2H^+ + 2\bar{e}$     OX = 0.0 V
CATHODE: $CH_3OH + 2H^+ + 2\bar{e} \rightarrow CH_4 + H_2O$    RED = 0.588 V
NET CELL: $H_2 + CH_3OH \rightarrow CH_4 + H_2O$     CELL = 0.588 V ATOMIC WEIGHTS: 2 | 32 | 16 | 18
WEIGHT: 3.295 Lbs | 7.414 Lbs | 9.061 Lbs | 1.648 Lbs W-H/412 Lbs.—$H_2$ = (27,123)(.001622)$\left(\dfrac{.412 \times 454}{2}\right)$ = 2,948.1

REFORMER Y: $CH_4 + 2H_2O \xrightarrow[CAT.]{HEAT} CO_2 + 4H_2$

ATOMIC WEIGHTS: 16 | 36 | 44 | 8
WEIGHT: 3.295 Lbs | 7.414 Lbs | 9.061 Lbs | 1.648 Lbs $H_2 = 1.648 - .142 = 1.236$ Lbs.

CELL Z: ANODE: $H_2 \rightarrow 2H^+ + 2\bar{e}$     OX = 0.0 V
CATHODE: $\frac{1}{2}O_2 + 2H^+ + 2\bar{e} \rightarrow H_2O$    RED = 1.229 V
NET CELL: $H_2 + \frac{1}{2}O_2 \rightarrow H_2O$     CELL = 1.229 V W-H/1.236 Lbs.—$H_2$ = (56,691)(.001627)$\left(\dfrac{1.236 \times 454}{2}\right)$ = 18,485.8

Fig. 10.

| | | 100% EFF. W-H | 50% EFF. W-H |
|---|---|---|---|
| CHART-A: | METHANOL | | |
| | 1 GAL. | | |
| | $H_2$ | 21,433.9 | 10,716.95 |
| | 1.648 | | |

| CHART-B: | MOTOR | WATTS | GAL./60MILES/Hr. | M.P.G. | RANG-15 GAL. TANK |
|---|---|---|---|---|---|
| | 8 H.P. | 5,965.6 | .557 | 107.7 | 1615.5 MILES |
| | 15 H.P. | 11,185.5 | 1.044 | 57.5 | 862.5 MILES |
| | 20 H.P. | 14,914.0 | 1.392 | 43.1 | 646.5 MILES |

METHANOL HYDROGEN FUEL CELL SYSTEM

This application is a continuation-in-part of application Ser. No. 682,983, filed Dec. 18, 1984, now abandoned.

This invention has to do with electro chemical fuel cells and is particularly concerned with a novel methanol-hydrogen fuel cell system and apparatus.

BACKGROUND OF THE INVENTION

Fuel cells in which hydrogen or hydrogen enriched gases are used as anode fuels are old in the art. Such fuel cells are generically called hydrogen fuel cells and operate to convert the chemical energy of the fuel (hydrogen) into electric energy by galvanic action.

In the recent past, special interest has been given to the use of methanol as a cheap and plentiful fuel for fuel cells. Due to the low energetic characteristics of methanol, when put to such use, that interest has, prior to my invention, failed to bring any notable beneficial results.

At present, the principal fuels used to generate electric energy, as in steam generating plants, are fossil fuels. In view of the projected increases in energy consumption and the constant diminishing supply of fossil fuels, it has been projected that the supply of fossil fuels will fall short of that which will be required to meet energy needs in the foreseeable future.

As a result of the above, there is an ongoing search for alternative fuels for the generating of electric power, which fuels are inexpensive and in plentiful supply. To the above end, it is understood that some new interest is being directed to the use of methanol as a potential alternative or substitute for fossil fuels. Presently, methanol can be effectively and economically produced from natural gas, coal and hydrocarbon oxidation and it is therefore substantially inexhaustible and such that its use as an alternative to fossil fuel is very promising.

In the past, methanol is known to have been used as a fuel in the electrolyte of fuel cells and has also been used as feed stock for the production of hydrogen or hydrogen enriched gas which might be advantageously used as a fuel in fuel cells. Methanol has been converted to hydrogen or hydrogen enriched gas by a process commonly called steam reformation. That process involves first reducing the methanol to methane gas and then reforming the methane gas to hydrogen or hydrogen enriched gas by combining the gas with steam at high temperature and in the presence of a suitable catalyst. That process is ordinarily carried out as an independent operation prior to putting the resulting hydrogen or hydrogen enriched gas to any desired or intended use.

OBJECTS AND FEATURES OF THE INVENTION

An object of my invention is to provide a novel methanol, hydrogen and air fueled fuel cell system and apparatus.

It is an object and a feature of my invention to provide a fuel cell system and apparatus of the character referred to wherein methanol is used as a cathode fuel for at least one fuel cell in the system and apparatus.

Yet another object and feature of my invention is to provide a system and apparatus of the character referred to wherein the methanol fuel is reduced to methane gas by fuel cell reaction, the methanol gas is reformed into hydrogen enriched gas and the hydrogen enriched gas is used to fuel the cell.

Still another object and feature of my invention is to provide a system and apparatus of the character referred to wherein byproduct methane gas of one or more methanol fueled fuel cells is used as feed stock for the production of hydrogen gas in a methane-steam reformer of the apparatus and wherein hydrogen or hydrogen enriched gas produced by the methane-steam reformer is used to fuel the anodes of the fuel cells of the system.

Finally, it is an object and feature of my invention to provide a system and apparatus of the character referred to wherein the cathodes of those fuel cells not fueled with methanol can be and are preferably fueled with oxygen (air).

The foregoing and other objects and features of my invention will be apparent and will be fully understood from the following description of my invention in which reference is made to the accompanying drawings.

DETAILED DESCRIPTION OF THE INVENTION

Figure 1:
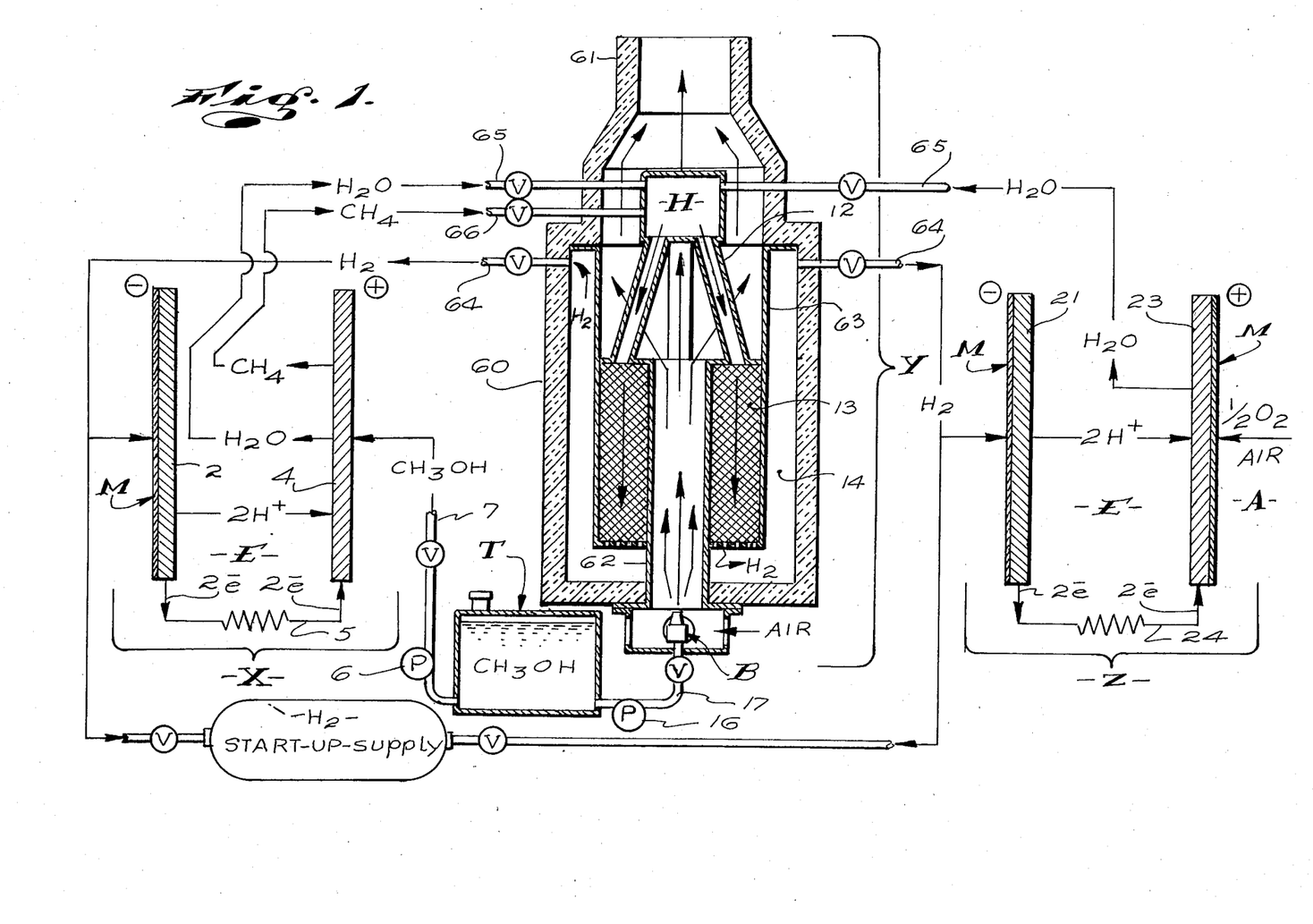
FIG. 1 is a diagrammatic view of a fuel cell system and apparatus embodying my invention.

In FIG. 1 of the drawings, I have diagrammtically illustrated one typical and preferred system and apparatus embodying my invention. The system illustrated includes a first fuel cell X, a steam-methane reformer Y and a second fuel cell Z. The system also includes a methanol supply tank T, hydrogen start-up-supply means, and an air supply A.

Figure 11:
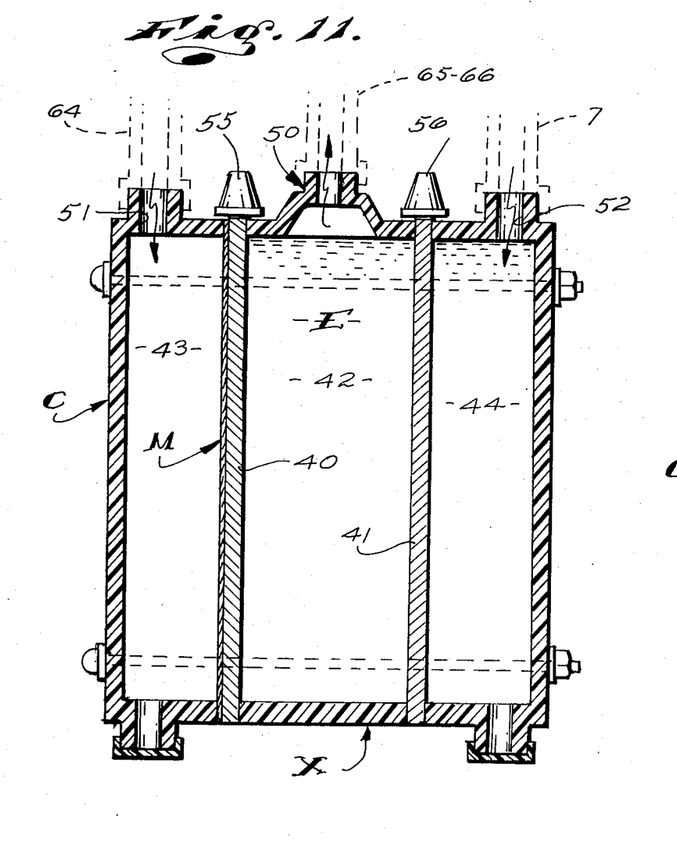
FIGS. 11 and 12 are diagrammtic sectional views of two fuel cell structures employed in my system.
Figure 12:
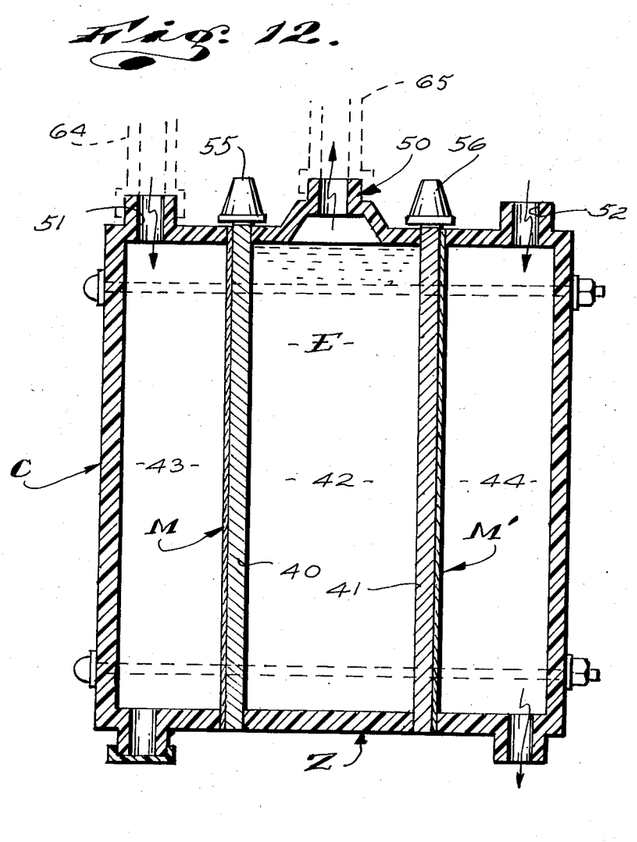

In FIGS. 11 and 12 of the drawings, I have illustrated the basic fuel cell structures employed to establish the above noted fuel cells X and Z.

As shown in FIG. 11, the fuel cell X includes an elongate horizontally extending box-like case C with top, bottom, side and end walls. A pair of flat, vertical, longitudinally spaced partition-like electrode plates 40 and 41, with flat opposing inner surfaces and flat, oppositely disposed outer surfaces are positioned and mounted within the case in longitudinally spaced relationship with each other and from the end walls of the case to define a central electrolyte chamber 42 between the plates, an anode fuel chamber 43 at one end of the case between the plate 40 and its related end wall of the case and a cathode fuel chamber 44 at the other end of the case between the plate 41 and its related end wall of the case. The central electrolyte chamber 42 contains a liquid electrolyte E, such as an aqueous acid solution. The chamber 42 is suitably vented at the top of the case as shown at 50 to exhaust the byproducts of fuel cell reaction within that chamber.

The electrode plates 40 and 41 are established of suitable porous catalyst material, such as porous particulate carbon which presents a large surface area and many active sites. The outer surface of the plate 40 is provided with a gas permeable hydrophobic membrane M so that a gaseous anode fuel, such as hydrogen or hydrogen enriched gas, can be effectively fed to the plate without free flow, passage and/or loss of the electrolyte E that enters and wets the surfaces and/or active sites of the plate.

A portion of the case defining the chamber 43 is suitably ported at 51 to allow for anode gas fuel to be conducted into the chamber and fed to the plate 40. A portion of the case defining the chamber 44 is ported, as at 52, to allow for cathode fuel, such as liquid or vaporous methanol to be conducted into the chamber 44 to feed the electrode plate 41.

Finally, the anode and cathode electrode plates 40 and 41 are connected with terminals 55 and 56 accessible at the exterior of the case and which facilitate connecting the fuel cell in a suitable external electric circuit 5 (See FIG. 1).

The fuel cell structure Z shown in FIG. 12 of the drawing is much the same as the fuel cell structure X shown in FIG. 11 and which is briefly described above. The only notable distinction between the structures of the cells X and Z is that the cathode plate 41 is made to be fed with a gaseous cathode fuel, such as oxygen or air, and is therefore provided with a gas permeable hydrophobic membrane M' at its outer surface.

Except for the added membrane M' in the fuel cell Z, the fuel Z is structurally the same as the fuel cell X. Accordingly, those parts and portions of the fuel cell Z which are similar and correspond with parts of the fuel cell X are identified by similar reference numerals where appropriate, and further detailed description of the cell structure Z can and will be dispensed with.

In the following, the anode and cathode electrode plates 40 and 41 of the fuel cell X will be referred to as the anode and cathode plates and will hereinafter be identified by the reference numerals 2 and 4. The anode and cathode electrode plates 40 and 41 will hereinafter be referred to as the anode and cathode plates of the fuel cell Z and will be identified by the reference numerals 21 and 23.

It is to be noted and understood that the structure of the fuel cells X and Z, illustrated and briefly described in the foregoing, can vary greatly in practice and that the cell structures shown are but examples of fuel cell structure that can be advantageously used in carrying out my invention.

The steam-methane reformer Y is an apparatus or device that operates to reform methane gas into hydrogen or hydrogen enriched gas by conducting a mixture of methane gas and steam over, across and/or through a catalyst, such as a bed of particulate nickel, at temperatures of in excess of 500° F., less than 1500° F., and preferably at about 1100° F. Such reformer apparatuses or devices are well-known in the art and have long been used to establish hydrogen gas or hydrogen enriched gas when such gas is needed and when there is a ready and available supply of methane gas to produce it.

To the best of my knowledge and belief, there is no standard make and/or design for steam methane reformers and those reformers which are provided and used throughout the arts are custom fabricated apparatuses or devices made in accordance with old and well established basic principles. It is understood that each such reformer is built to meet the special requirements or needs of its user and that in the course of being fabricated and put into operation is emperically tested to ascertain and to make those adjustments that are or might be required to meet operating requirements.

For full and detailed description and explanation of the operation of methane steam reformers, reference is made to the published teachings or Robert N. Pease and Paul R. Chesebro in the article entitled "Equilibrium in Reaction $CH_4 + 2H_2O \rightleftharpoons CO_2 + 4H_2$" in the Journal of American Chemical Society, Volume 50, 1464 (May, 1928) and further, to the published teaching of W. Akers and D. P. Camp of the Rice Institute of Houston, Tex., entitled "Kinetics of the Methane-Steam Reaction" in American Institute of Chemical Engineers Journal, Volume 1, No. 4, page 471 (December, 1955).

In accordance with the teachings of the above referred to publications, it will be apparent that methane gas is readily reformed into hydrogen or hydrogen enriched gas suitable for use as an anode fuel for hydrogen fuel cells by any apparatus or device into which suitable volumes of methane gas and steam can be conducted, combined and moved into contact with a suitable catalyst, such as a bed of particulate nickel, at a temperature in excess of 500° F. and preferably at a temperature of about 1100° F., and from which the reformed hydrogen or hydrogen enriched gas can be conducted for subsequent use.

The methane steam reformer Y shown in FIG. 1 of the drawings is illustrative of that reformer that I fabricated for use in reducing my invention to practice. The reformer Y was fabricated in accordance with the basic teachings of the above noted and incorporated publications. The reformer Y includes an elongate vertical external housing 60 with a cylindrical side wall and with top and bottom walls. An elongate vertical chimney 61 extends up from the top wall of the housing. The housing chimney are shown established of a suitable heat insulating material. They can be established of a suitable metal and surrounded by a suitable heat insulating jacket structure. An elongate vertical draft tube 62 extends upwardly from the bottom wall of the housing and communicates with the lower end of the chimney 61. An elongate vertical cylindrical casing 63 depends from the top wall of the housing in radial spaced relationship between the side wall thereof and the draft tube. The casing 63 cooperates with the draft tube 62 to define an annulus in which a reactor catalyst 13 of particulate nickel or other suitable material is contained. The upper and lower ends of the annulus defined by the casing and the draft tube are closed by annular horizontal walls which are suitably ported to allow for the entry and exit of gases into and from the annulus and the reactor catalyst 13.

The casing cooperates with the side wall of the housing to define a reformed gas collecting chamber 41.

Reformed gas delivery lines 41, with adjustable flow metering valves therein connect with the upper portion of the chamber 14 and are provided to conduct reformed gas from the reformer Y to the anode plates 2 and 21 of the fuel cells X and Z.

The reformer Y next includes a metal cannister type preheater H positioned centrally within the chimney 61 above the upper open end of the draft tube 62. The preheater is connected with the upper end of the annulus in which the reactor catalyst 13 is contained by a plurality of secondary heating tubes 12, substantially as shown. Water (water vapor or steam) inlet lines 65 with adjustable flow metering valves therein connect with the preheater H and are provided to extend to the vents 50 of the fuel cells X and Z and to conduct water produced within those cells to the preheater H of the reformer. Additionally, a methane gas inlet line 66 with adjustable flow metering valve therein can be provided and is shown connected with the preheater H. The line 66 is provided to extend to the vent 50 of the fuel cell X and to conduct methane gas produced in that cell to the preheater H of the reformer Y. In practice, the function of the line 66 may be served by the line 65 extending to the fuel cell X and may be advantageously eliminated.

Finally, the reformer Y includes a methanol burner B at the bottom of the housing and at the lower open end of the draft tube 62. The burner B is within a burner box which provides adequate combustion air for the burner and the burner is supplied with methanol fuel, under suitable pressure, by a pump 16 engaged in a line 17 extending between the burner and the methanol supply tank T. The draft tube 62 and chimney 61 of the reformer are designed and proportioned to draw an abundance of combustion air to the burner B and to assure the establishment and maintenance of a flame which is sufficiently hot to heat the reformer to desired and adequate operating temperature.

In the following description of my invention, those chemical reactions which take place in the cell X, reformer Y and cell Z will be given independent consideration and described separately.

In carrying out my invention, while the anode fuel of the first fuel cell X might include a suitable metal or liquid fuel, it is preferred that the anode fuel be hydrogen or hydrogen enriched gas $H_2$.

The anode fuel gas $H_2$ reacts with the anode plate 2 and results in the generating of two hydrogen ions ($H_2+$) and two free electrons ($2e^-$). The two hydrogen ions move through the electrolyte E in the cell to the cathode plate 4. The two free electrons ($2e^-$) are conducted from the anode plate 2 through the external circuit 5 which is connected with and between the anode and cathode plates.

Figure 2:
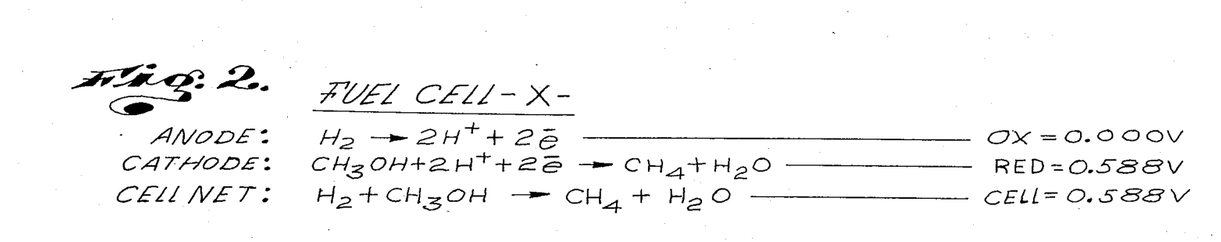
FIG. 2 is that chemical formula that describes the operation of the first of two fuel cells in my system.

The cathode fuel is methanol ($CH_3OH$). The methanol is stored in the tank T and is moved therefrom through a line 7, by gravity or by means of a pump 6. The methanol in the cell X reacts at the cathode plate 4 of the cell. The reaction occurring at the cathode plate is clearly described in the formula set forth in FIG. 2 of the drawings and is as follows, $CH_3OH + \cdot + 2e^- \rightarrow CH_4 + H_2O$. The foregoing reaction is an important feature of my invention. It is to be noted that the electrons ($2e^-$) given up by the anode plate 2 enter the external electric circuit 5 and move to and collect on the surface of the cathode plate 4. The electrons ($2e^-$) on the cathode plate 4 react with hydrogen ions ($2H+$) and methanol ($CH_3OH$) to form (by reduction) methane gas ($CH_4$) and water ($H_2O$) at said cathode plate. The pathway for the noted directional flow of hydrogen ions ($2H+$) through the electrolyte E may be viewed as the internal circuit of the fuel cell X and the pathway for the flow of electrons ($2e^-$) through the circuit 5 may be viewed as the external circuit of that fuel cell.

In my invention, I have harnessed the energy of the fuel cell X which is mostly electrical energy. Also, two important byproducts are generated, that is, the byproduct methane gas ($CH_4$) and water ($H_2O$), to be used to generate hydrogen or hydrogen enriched gas in the reformer Y, as will hereinafter be described.

Next to be considered and described is the operation of the reformer Y. The reformer Y, which is an important component of my invention, is a fuel conditioner which catalytically reforms methane gas by reaction with steam into hydrogen enriched gas or hydrogen ($H_2$) for use as an anode fuel in both the first and second cells X and Z.

In operation of my invention, the reformer Y is first heated to an effective operating temperature by means of the burner B thereof. A temperature of about 1100° F. is preferred. Water ($H_2O$) which is a byproduct of fuel cell reaction of both cells X and Z is conducted through lines 65 and fed into the preheater H of the reformer Y. As a result of heat generated in the cells X and Z during operation thereof, the water ($H_2O$) leaves the cells in the form of steam or vapor. The water ($H_2O$) delivered into the preheater H of the reformer Y is heated therein to the operating temperature of the reformer Y and to steam. The methane gas produced in the fuel cell X is conducted to the preheater H through line 66 where it is heated and combined with the steam in the preheater. The heated and combined methane gas and steam is conducted from the preheater H through the heating tubes 12 of the reformer into the reactor catalyst 13 thereof. Upon moving through the reactor catalyst, the combined methane and steam react and are discharged into chamber 14 of the reformer in the form of hydrogen or hydrogen enriched gas.

As previously described, during operation of my invention, liquid methanol is moved from the tank T to the burner by means of the pump 16 and is mixed with air at the burner B to establish a combustible mixture. That combustible mixture is ignited at the burner B and within the lower end portion of the draft tube 62 of the reformer. The hot gases generated by the combustion of the methanol is used to heat the catalyst 13, tubes 12, and and the preheater H, and if desired, can be conducted from the reformer Y to the fuel cell X and/or the fuel cell Z to heat the cell or cells if performance thereof is required or enhanced by heating.

In accordance with the above cited teachings of Robert N. Pease and Paul R. Chesebro, effective reforming of methane and steam to establish hydrogen gas or a hydrogen enriched gas in a reformer such as here provided is effected at temperatures as low as 500° F. However, in accordance with the above cited teachings of W. W. Akers and D. P. Camp, optimum operating temperature of such a reformer is approximately 1,180° F. According to the teachings of W. W. Akers and D. P. Camp, the thermodynamic relationship of the methane-steam reaction in a reformer such as here provided is such that at temperatures substantially below 1100° F., the equilibrium conversion of methane is sufficiently low that the reaction may be insignificant. As the temperature is increased, the conversion increases but the possibility of forming carbon is greatly increased. At temperatures above 1180° F., the combined methane and steam must contain excess steam ($H_2O$) to prevent forming of carbon. Accordingly, in carrying out my invention, the volume of water delivered to the preheater H must be suitably balanced with the volume of methane generated in the fuel cell X and delivered to the preheater H and that balance of water and methane must be adjusted relative to the operating temperature attained within the reformer. To the above end, I provide the several lines 64, 65 and 66 with the aforementioned adjustable flow rate control valves which, as is apparent, can be operated to adjust and vary the flow rate and/or volume of both water and methane delivered to the reformer Y as well as the flow rate of the combined water and methane through the reactor catalyst and the flow rate and volume of hydrogen or hydrogen enriched gas from the reformer to the cells X and Z. Thus, substantially complete control of the operation of my reformer is provided therefor.

When operating my reduction to practice of the invention, adjustment of the operation of the reformer Y to produce a usable supply of hydrogen or hydrogen enriched gas was quickly attained by putting the reformer into operation and adjusting certain of the flow rate control valves in accordance with simple emperical testing procedures.

Figure 4:
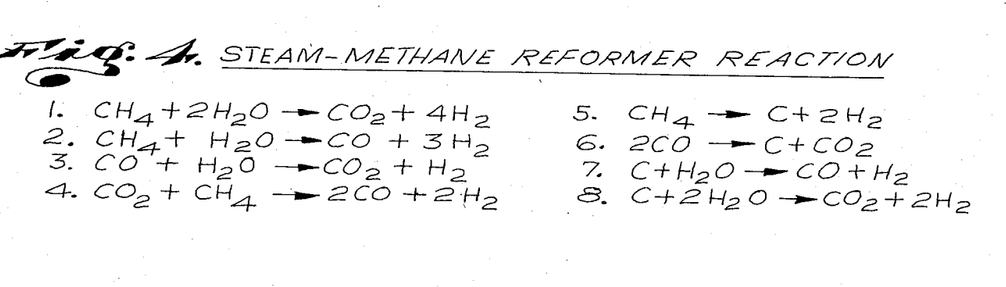
FIG. 4 is that chemical formula that describes the operation of the steam-methane reformer of my invention.
Figures 5, 8:
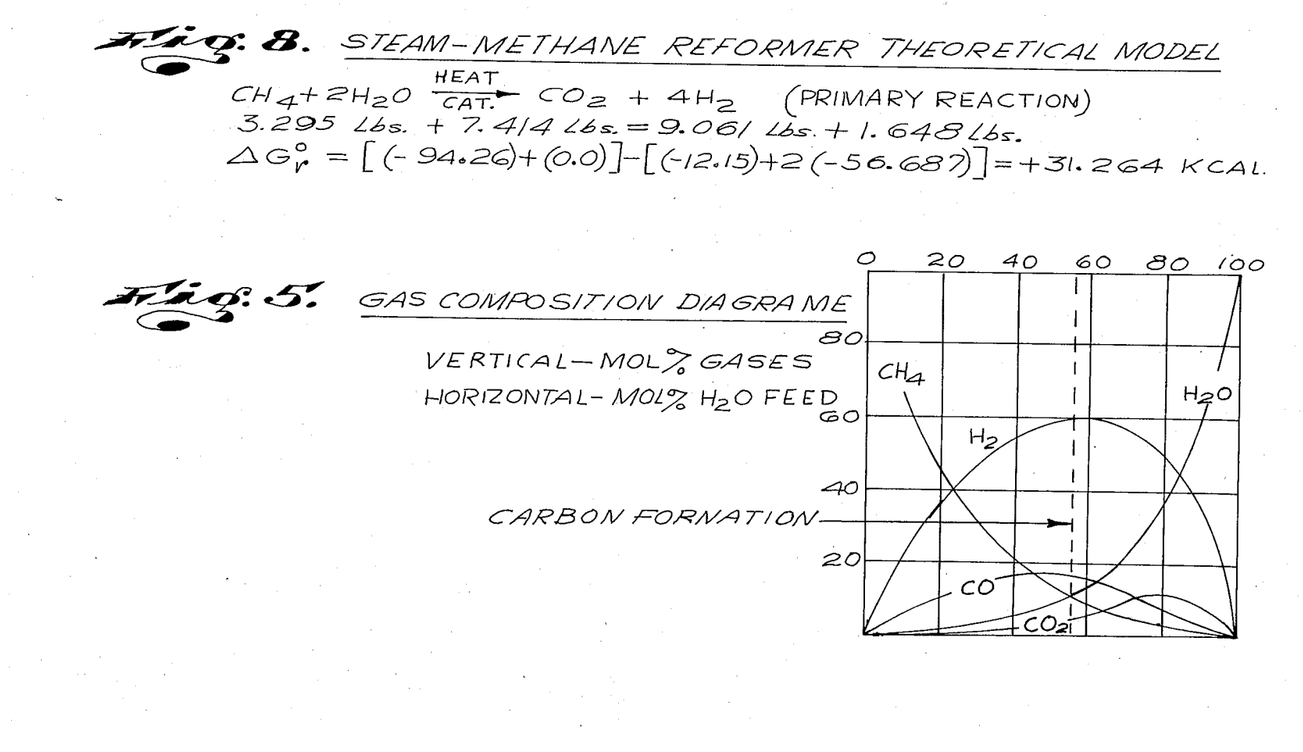
FIG. 5 is a steam reformer diagram.
FIG. 8 is a theoretical model formula for the steam methane reformer.

The theoretical overall reaction of methane and steam to form carbon, carbon monoxide, carbon dioxide and hydrogen is set forth in the eight equations in FIG. 4 of the drawings and in the gas composition diagram shown in FIG. 5 of the drawings. The noted theoretical overall reaction is based upon the optimum operating temperature of 1180° F. set forth in the above noted teachings of W. W. Akers and D. P. Camp.

Attention is next directed to the operation of the second fuel cell Z. The anode fuel for the fuel cell Z is hydrogen ($H_2$) or hydrogen enriched gas produced in the reformer Y and supplied to the surface of the anode plate 21 of the cell Z. The anode fuel ($H_2$) reacts at the plate 21 and results in the generating of two hydrogen ions ($2H^+$) and two free electrons ($2e^-$). The two hydrogen ions ($2H^+$) move through the electrolyte E.

Figure 3:
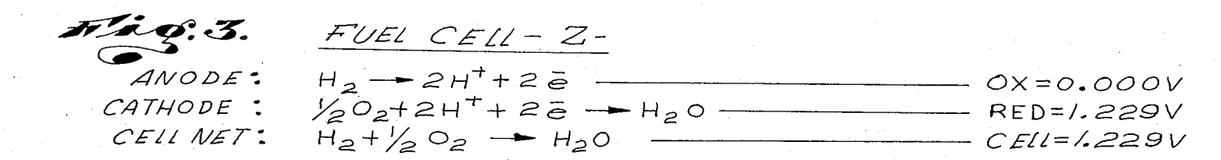
FIG. 3 is that chemical formula that describes the operation of the second of the two fuel cells in my system.

Considering the operation of the fuel cell Z in that embodiment of my invention in which oxygen (from the air) is used to fuel the cathode plate 23 of the cell, reference is made to the formula shown in FIG. 3 of the drawings.

In the cathode reaction as shown in FIG. 3 of the drawings, the electrons ($2e^-$) given up by the plate 21 move through a related external circuit 24 and collect on the surface of the cathode plate 23. The electrons on the plate 23 react with the hydrogen ions ($2H^+$) to form water 25 ($H_2O$) at the electrode. The pathway for the directional flow of the hydrogen ions ($2H^+$) through the electrolyte E of the cell Z can be considered the internal circuit of the cell and the pathway for the flow of electrons ($2e^-$) can be considered the external circuit of that cell.

It will be apparent that in my invention, I have harnessed the energy of the hydrogen fuel $H_2$ in the second fuel cell Z, which is mostly electric energy and have also produced water ($H_2O$) as an important byproduct for use in the reformer Y and which is conducted from the cell Z to the reformer by its related line 65.

While in that preferred carrying out of my invention, illustrated and described above, the cathode fuel is oxygen from the air, it will be apparent that other suitabvle cathode fuels might be used without departing from the broader aspects and spirit of my invention. For example, the cathode fuel for the fuel cell Z might be hydrogen peroxide ($H_2O_2$) or nitric acid ($HNO_3$). Further, the fuel cell Z could, if desired, be a phosphoric acid fuel cell system or a suitable alkaline fuel cell system without departing from or adversely affecting my invention.

Figure 6:
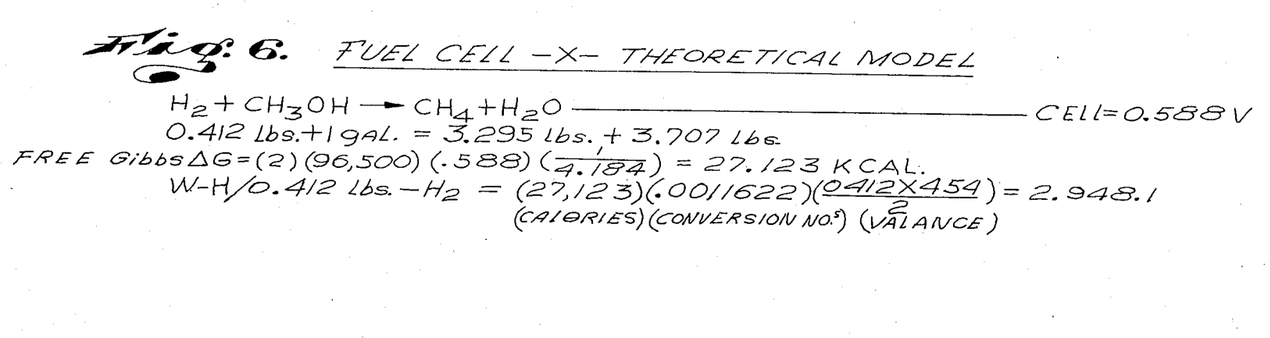
FIG. 6 is a theoretical model formula for one fuel cell.
Figure 7:
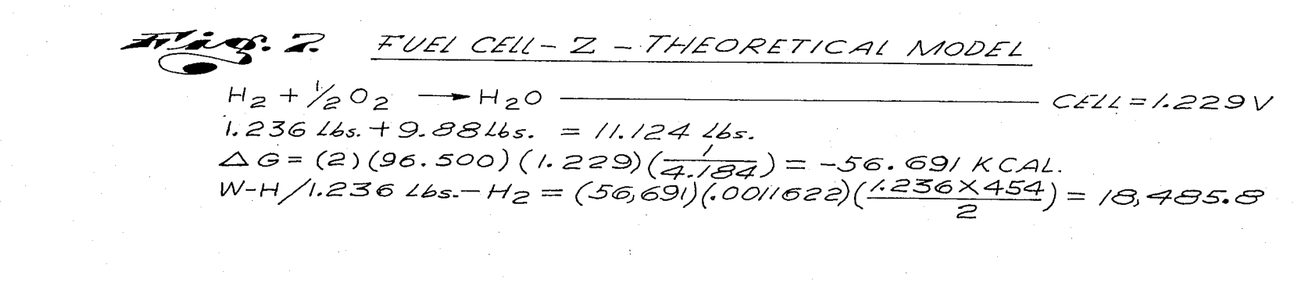
FIG. 7 is a theoretical model formula for the other fuel cell.

In FIGS. 6 and 7 of the drawings, I have shown the change in the Gibbs free energy for the maximum amount of useful work that can be derived by the related or tandem fuel cells X and Z of my invention. Further, in FIG. 8 of the drawings, I have shown the amount of work that is required for the primary chemical reaction to take place.

Also, in FIGS. 6, 7 and 8 of the drawings, I have shown the theoretical weights or amounts of the products and reactants used in carrying out my invention. In FIG. 6, I start with one gallon of methanol ($CH_3OH$) as a base line and 0.412 lbs. of hydrogen gas ($H_2$) as reactants; and 3.295 lbs. of methane gas ($CH_4$) and 3.707 lbs. of water ($H_2O$) as products of theoretical fuel cell reaction.

The 3.295 lbs. of methane gas ($CH_4$) from the above reaction and the 7.414 lbs. of water ($H_2O$) from fuel cell reaction is fed into the steam-methane reformer as shown in FIG. 8 of the drawings as reactants; and 9.061 lbs. of carbon dioxide gas ($CO_2$) and 1.648 lbs. of hydrogen rich feed gas ($H_2$) as products of the steam-methane reformer theoretical reaction. The said hydrogen rich feed gas ($H_2$) is used as follows: 0.412 lbs. ($H_2$), as noted above and shown in FIG. 6, and 1.236 lbs. ($H_2$) is used to fuel fuel cell Z, as shown in FIG. 7 of the drawings.

Next, and as shown in FIG. 7, the 1.236 lbs. of hydrogen rich feed gas ($H_2$) and 9.88 lbs. of oxygen ($O_2$) from the air as reactants; and 11.124 lbs. of water ($H_2O$) is the product of theoretical reaction of the fuel cell Z.

Therefore, the maximum amount of useful work from one gallon of methanol ($CH_3OH$) used in my theoretical model is 2,948.1 watt hours for fuel cell X and 18,485.8 watt hours for fuel cell Z; and 31.264 KCAL are used in the steam-methane reformer.

Unfortuntely, not all the power from the fuel cell comes out as useful electric power for performing desired work. The loss of some power is caused by heat in the fuel cells, combustion and thermal inefficiencies in the reformer Y, chemical reaction losses, cell internal resistance losses, etc. Therefore, the power output of the cells is necessarily equal to theoretical power minus all the power losses, and efficiency is dependent upon how well the theoretical power is converted to watt hours output. If losses are low, efficiency is said to be high. In accordance with the foregoing, a comparison of the watt hours generated with 1 gallon of methanol at 100% and 50% efficiency is set forth in chart A of FIG. 10 of the drawings.

Figure 10:
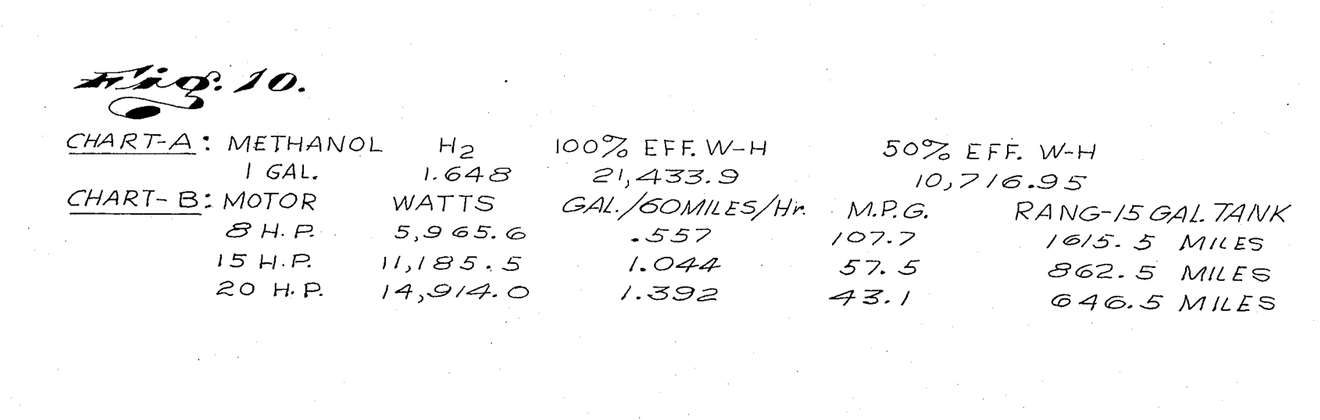
FIG. 10 is a theoretical performance analysis.

In chart B of FIG. 10 of the drawings, I have set forth the theoretical effectiveness and efficiency to power electric motor driven vehicles with the apparatus or systems embodying my invention, assuring 50% cell efficiency, or the generating of 10,716.95 watt hours per gallon of methanol. In chart B, the watts required for high torque, low R.P.M., flat line operation of 8, 15 and 20 horsepower is set forth. The rate of consumption of methanol in gallons per hour, at 60 miles per hour, is set forth, the miles per gallon and the miles on 15 gallons of methanol are set forth. Since the work output of electric motors is roughly five times the work output of internal combustion engines of like horsepower rating, the noted 8, 15 and 20 horsepower motors are equivalent to 40, 75 and 100 horsepower internal combustion engines. In accordance with the foregoing, the use of fuel cell systems or apparatus embodying my invention should, in theory, be highly effective and efficient for powering electric motor driven vehicles.

Figure 9:
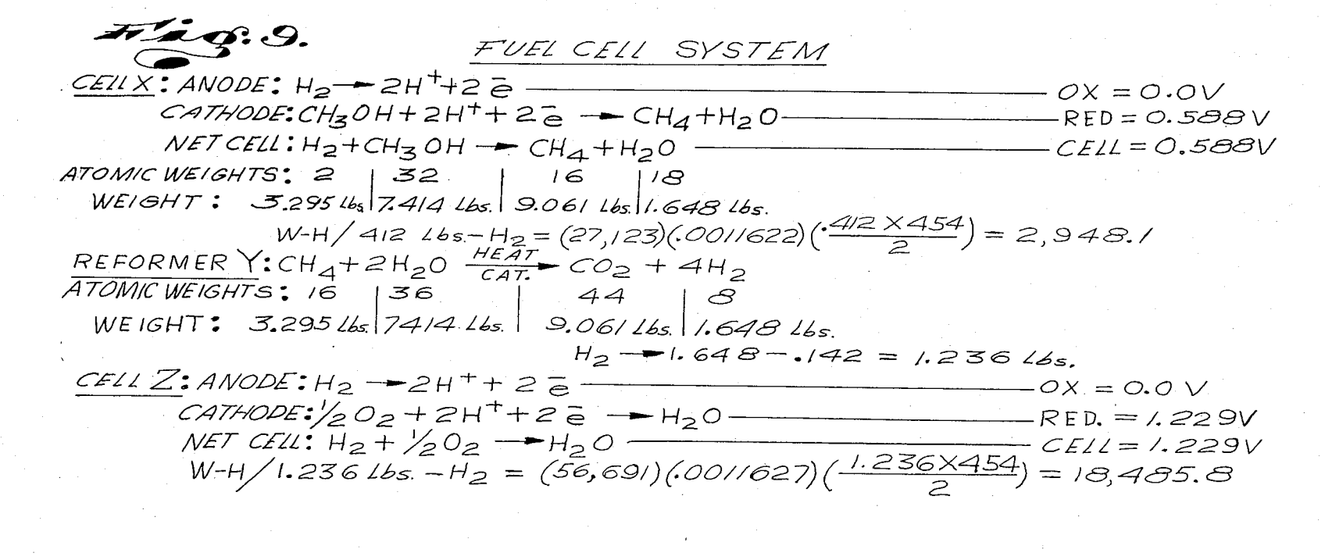
FIG. 9 is a fuel cell system formula.

In FIG. 9 of the drawings, headed "FUEL CELL SYSTEM", I have correlated that which is set forth in FIGS. 2 through 4 and 6 through 8 of the drawings and have set forth the formula for the overall basic system. FIG. 9 is intended to supplement that which is shown in and taught by the other noted figures of the drawings and does not call for or require separate consideration or further special comment.

The previously referred to start-up-supply means includes a supply cylinder of compressed hydrogen gas which is connected with the anode compartments of the cells X and Z by delivery lines having flow control valves engaged therein, substantially as diagrammatically illustrated in FIG. 1 of the drawings.

When putting my original test apparatus in operation and while testing it, the flow control valves in the lines 64, 65 and 66 were open; the burner B of the reformer Y was put into operation and the reformer was allowed to become thoroughly heated. The temperature in the chamber 14 of the reformer Y was observed to be in excess of 600° F. (by means of a thermometer entered into the chamber 14 through an opening in the housing 60). The flow of methane from the tank T into the chamber 44 of cell X and a flow of hydrogen gas from the start-up-supply to the chamber 43 of both cells was commenced. Chemical reaction and the generating of electric current in both cells was observed by means of ammeters connected with the circuits 5 and 24. To excite fuel cell reaction and to speed up testing, the cells X and Y were placed in an oven and heated to about 180° F. (below the boiling temperature of the electrolytes E within the cells). When functioning of the cells was observed to stabilize, the oven was turned off and I commenced to reduce and to finally shut off the flow of hydrogen gas from the start-up-supply means to the cells and continued to monitor fuel cell operation by means of the ammeters. After the supply of hydrogen gas from the start-up-supply means was shut off, the cells X and Z continued to function and to generate measureable electric current for protracted test periods sufficient to establish the fact that the reformer Y functioned to generate sufficient hydrogen enriched gas fuel for delivery to and to maintain the cells operating and that the cells generated and delivered adequate supplies of methane gas and water to the reformer Y for production of said hydrogen enriched gas fuel which was delivered to and maintained the cells operating.

Due to apparent imperfect design and balance of the prototype fuel cells X and Z and of the reformer Y of my above referred to and only reduction to practice of the invention, certain inefficiencies were to be expected and did materialize, but the principle of operation and utility of the apparatus and system were satisfactorily proven thereby.

Having described only one typical preferred structural embodiment of my invention and the functional aspects and/or mode of operation thereof, I do not wish to be limited to the specific details herein set forth but wish to reserve to myself any modifications and/or variations that might appear to those skilled in the art and which fall within the scope of the following claims.

Having described my invention, I claim:

1. An electro chemical electric power generating apparatus comprising first and second electro chemical fuel cells including spaced anodes and cathodes, electrolytes between the anodes and cathodes, and external electric circuits connecting the anodes and cathodes, a steam-methane reformer which operates to reform steam and methane gas into a hydrogen rich gas fuel, the cathode and anode fuels of the first fuel cells are methanol and hydrogen and the byproducts of chemical reaction thereof are water and methane gas, the cathode and anode fuels of the second fuel cell are oxygen and hydrogen and the byproduct of chemical reaction thereof is water, the methane gas byproduct of the first fuel cell and the water byproduct of the first and second fuel cells are conducted to the steam-methane reformer and reformed thereby into hydrogen rich fuel gas, the hydrogen rich fuel gas reformed by the steam-methane reformer is conducted to and feeds the anodes of the fuel cells.

2. The apparatus set forth in claim 1 wherein the oxygen fuel for the cathode of the second cell is oxygen from air.

3. The apparatus set forth in claim 1 which includes a start-up supply of hydrogen gas and valve controlled delivery means to selectively conduct hydrogen gas to the anodes of the first and second cells when the apparatus is put into operation and to commence fuel cell reaction.

4. The apparatus set forth in claim 1 which includes a supply of methanol and means to move the methanol from the supply of methanol to the cathode of the first cell.

5. The apparatus set forth in claim 1 wherein the steam-methane reformer includes a burner to convert water to steam and to heat a catalytic heater that receives methane gas from the first cell and water from the first and second cells.

6. The apparatus set forth in claim 1 wherein the steam-methane reformer includes a methanol and air supplied oxygen fueled burner to convert water to steam and to heat a catalytic heater that receives methane gas from the first cell and water from the first and second cells.

7. The apparatus set forth in claim 1 wherein the steam-methane reformer includes a methanol and air supplied oxygen fueled burner to convert water to steam and to heat a catalytic heater that receives methane gas from the first cell and water from the first and second cells, said apparatus further includes a supply of methanol and means to move the methanol from the supply of methanol to the cathode of the first cell and to said burner.

8. The apparatus set forth in claim 1 wherein the steam-methane reformer includes a methanol and air supplied oxygen fueled burner to convert water to steam and to heat a catalytic heater that receives methane gas from the first cell and water from the first and second cells, said apparatus further includes a supply of methanol and means to move the methanol from the supply of methanol to the cathode of the first cell and to said burner, said apparatus further includes a start-up supply of hydrogen gas and valve controlled delivery means to conduct hydrogen gas to the anodes of the first and second cells when the apparatus is put into operation and to initiate fuel cell reaction.

* * * * *